United States Patent
Xiao et al.

(10) Patent No.: US 7,965,763 B2
(45) Date of Patent: Jun. 21, 2011

(54) DETERMINING A BIT ERROR RATE (BER) USING INTERPOLATION AND SUPERPOSITION

(75) Inventors: Kai Xiao, University Place, WA (US); Beomtaek Lee, Mountain View, CA (US); Xiaoning Ye, Portland, OR (US); Chung-Chi Huang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 11/981,204

(22) Filed: Oct. 31, 2007

(65) Prior Publication Data

US 2009/0110042 A1    Apr. 30, 2009

(51) Int. Cl.
*H04B 17/00* (2006.01)
(52) U.S. Cl. .......... 375/226; 375/260; 375/371; 702/69; 370/247; 370/249; 370/360
(58) Field of Classification Search .............. 375/226, 375/260, 371; 398/22, 27; 370/247, 249, 370/360; 702/69
See application file for complete search history.

(56) References Cited

U.S. PATENT DOCUMENTS

| | | | |
|---|---|---|---|
| 6,009,488 A | 12/1999 | Kavipurapu | 710/105 |
| 6,795,496 B1* | 9/2004 | Soma et al. | 375/226 |
| 7,162,207 B2* | 1/2007 | Kursula et al. | 455/67.14 |
| 7,516,030 B2* | 4/2009 | Miller | 702/69 |
| 7,613,393 B2* | 11/2009 | Aronson et al. | 398/16 |
| 7,623,581 B2* | 11/2009 | Nadig et al. | 375/260 |
| 2004/0205431 A1* | 10/2004 | Moore et al. | 714/728 |
| 2006/0251200 A1* | 11/2006 | Miller | 375/371 |
| 2008/0267274 A1* | 10/2008 | Tabatabaei | 375/226 |

\* cited by examiner

*Primary Examiner* — Eva Y Puente
(74) *Attorney, Agent, or Firm* — Trop, Pruner & Hu, P.C.

(57) ABSTRACT

In one embodiment, the present invention includes a method for receiving a jitter profile and a step response of a channel coupled between a transmitter and a receiver and a bit pattern to be transmitted, transmitting the bit pattern along the channel from the transmitter to the receiver with the jitter profile and the step response, receiving the bit pattern at the receiver and converting the bit pattern to a data stream by interpolating the step response according to a jitter of a current bit to obtain a jittery step response, superposing the jittery step response onto the data stream, calculating the jitter at each transition bit of the bit pattern by determining a time difference between actual and ideal crossing points, incrementing a jitter distribution function with the jitter, and generating a timing curve for the channel using the jitter distribution function. Other embodiments are described and claimed.

18 Claims, 5 Drawing Sheets

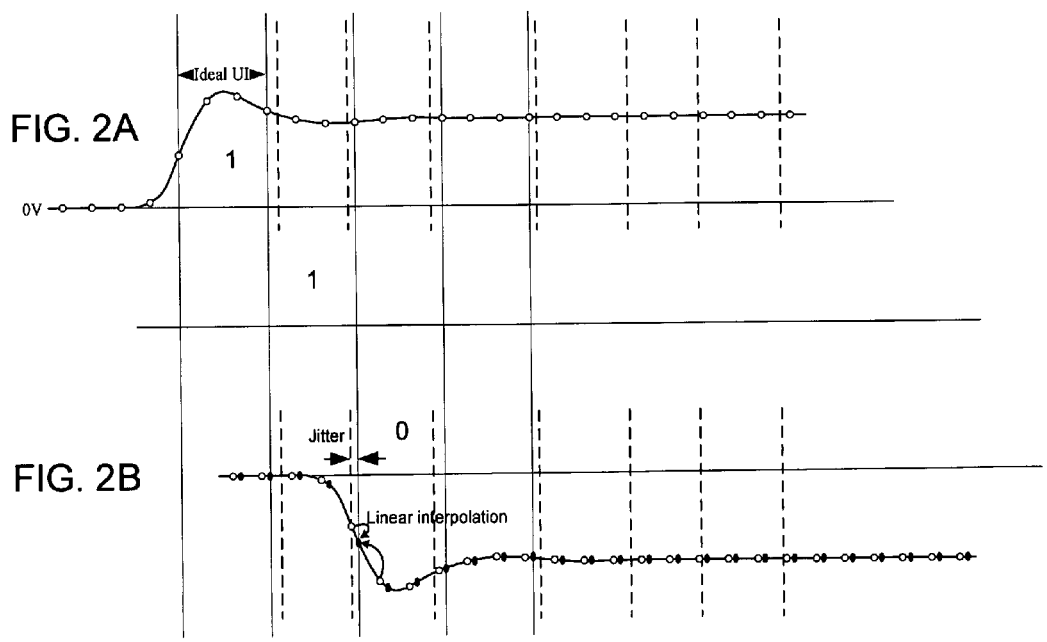
FIG. 2A
FIG. 2B
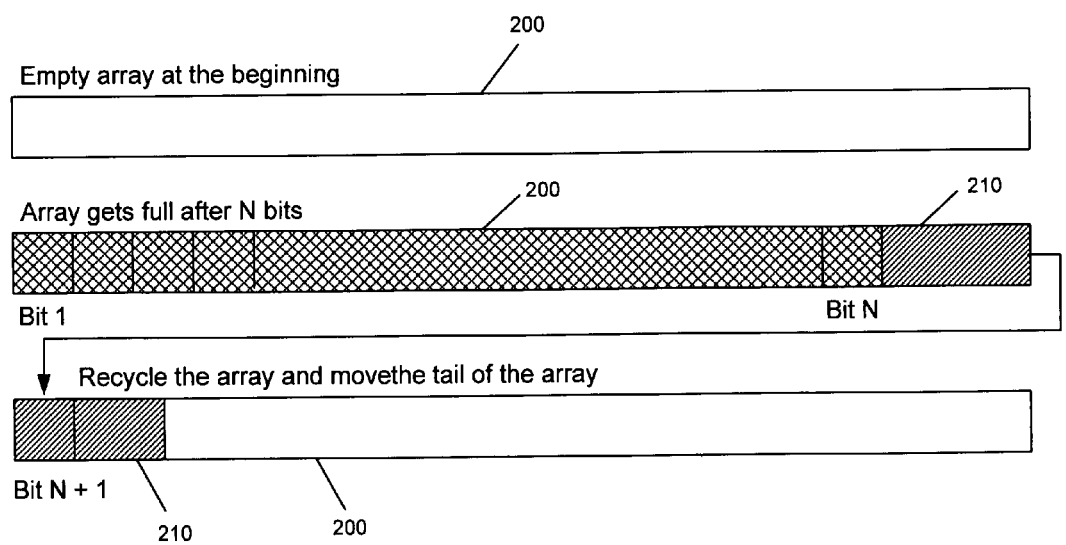
FIG. 3

DETERMINING A BIT ERROR RATE (BER) USING INTERPOLATION AND SUPERPOSITION

BACKGROUND

Bit Error Rate (BER), defined as the ratio of the erroneous bits received to the total number of bits transmitted, is a key performance indicator for a communication channel. A good design of a high-speed serial bus needs to meet the BER requirement defined in the specification. Current and future protocols call for BER requirements of $1 \times 10^{-12}$-$1 \times 10^{-14}$, and the BER is expected to be lower in the future.

Factors impacting the BER of a signal link include jitter profiles of transmitter, receiver, and clock distribution, interconnect jitter, coding, and equalization scheme. The random nature of the jitter and bit pattern determines that BER is a statistical indicator, the mean time to error of a channel. A widely used BER representation is the timing/voltage bathtub curve. Determining this curve and its resulting BER at a given eye width margin to achieve BER requirement can be difficult and time consuming.

BRIEF DESCRIPTION OF THE DRAWINGS

FIGS. 2A and 2B are graphical illustrations of an interpolation and superposition in accordance with one embodiment of the present invention FIG. 3 is a block diagram of dynamic array reuse in accordance with one embodiment of the present invention.

DETAILED DESCRIPTION

Embodiments may be implemented using a software tool to perform fast bit error rate (BER) calculations. It can be applied to the link performance analysis of a wide range of busses for high speed differential serial links, including various point-to-point (PTP) links, fully buffered dual in-line memory module (FBD), PCI Express™ (PCIE), serial advance technology attachment (SATA), serial attached SCSI (SAS), universal serial bus (USB), 10 gigabit Ethernet (10GE), etc. The tool can further be extended for single-ended or multi-drop high speed links. Embodiments take a channel step response and jitter profiles of the devices (i.e., transmitter and receiver), and then convert the input bit sequence to a data stream at the receiver. The output of the tool is the timing and voltage bathtub curves, the performance indicator of a communication channel.

Figure 1:
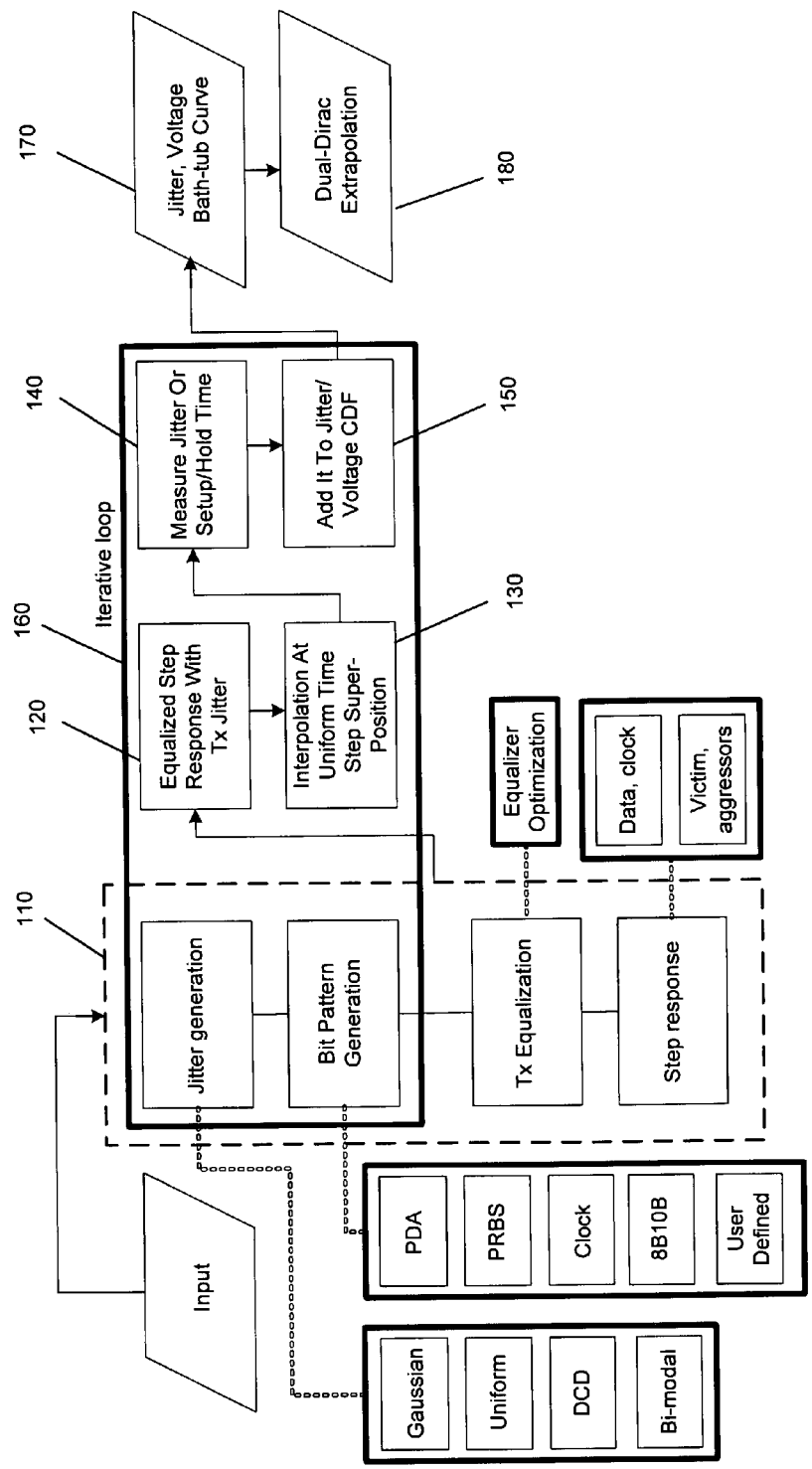
FIG. 1 is a flow chart of a method in accordance with one embodiment of the present invention.

FIG. 1 is a flow chart of a method in accordance with one embodiment of the present invention, which may be implemented in a software tool, for example. At block 110, the method takes the inputs of the step response of the channel to be evaluated, the jitter profiles of the transmitter and receiver, the bit pattern definition, and equalization settings. As shown in FIG. 1, jitter profiles may be according to a Gaussian distribution, a uniform distribution, a discrete cosine transform (DCT) distribution or a bi-modal distribution. For example, bit patterns, which may correspond to different coding schemes, may include a peak distortion analysis (PDA) bit pattern, a pseudo random bit sequence (PRBS) bit pattern, a clock pattern, an 8 bit/10 bit (8B/10B) coding or a user defined bit pattern. The transmitter equalization may be obtained according to a given equalizer optimization routine, while the step response may vary based on a data or clock pattern and whether the signal is a victim or aggressor. Note that other input information may be provided in other embodiments. Thus a bit pattern is generated and transmitted with an equalized step response with generated transmission jitter (block 120).

Embodiments then convert the bit pattern to the data stream at the receiver by interpolating and superposing the step response (block 130). Once the data stream is available, the jitter at each transition bit can be calculated by measuring the time difference between the actual and the ideal reference-crossing points. More specifically, the jitter may be measured or set up/hold time measured (block 140), and the measured amount may be added to the jitter voltage cumulative density function (CDF) (block 150). Note that blocks 110-150 may be performed in an iterative loop (block 160) until all desired data is obtained. Then at blocks 170 and 180, the timing bathtub curve thus is generated from the jitter distribution function. Specifically, the timing bathtub curve may be generated at block 170, using a dual-dirac extrapolation (block 180) to generate each branch associated with the cumulative probability distribution.

Embodiments thus use interpolation and superposition instead of direct convolution, and numerical operations only happen at the transition bits, as shown in FIGS. 2A-2B, which are graphical illustrations of an interpolation and superposition in accordance with one embodiment of the present invention. As shown in FIG. 2B, when there is a bit transition, the input step response is first interpolated according to the jitter at the current bit to get the jittery step response, and then the jittery step response is superposed onto the data waveform to complete the conversion from bit sequence to data stream. Such an implementation eliminates the round-off error associated with the time resolution of the input waveform in the direct convolution method, and, hence, improves the simulation accuracy.

Some embodiments may be programmed in C++ with careful memory management. The mechanism of dynamically reusing the memory allocated for the data stream arrays implemented in an embodiment, as illustrated in FIG. 3, enables BER simulations with a bit sequence up to 100 million long with fast runtime. As shown in FIG. 3, an empty array 200 is shown at the beginning of a BER analysis. After N bits, the array 200 becomes full. To enable further BER analysis, the array is recycled from beginning to end and the tail 210 of the array is moved to the head of array 200 such that further BER analysis may be performed to fill in the remaining portion of array 200 with additional bits.

Figure 4B:
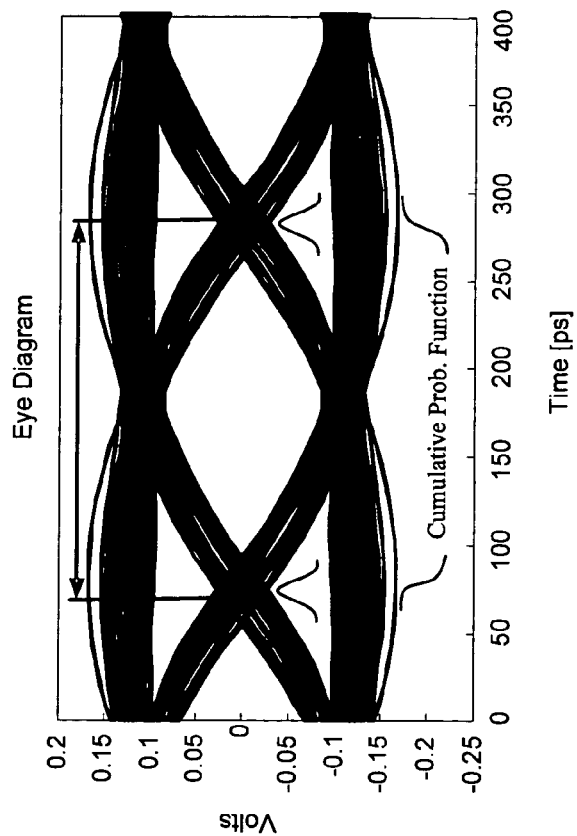
FIGS. 4A and 4B are an example of a timing bathtub curve and its relation to an eye diagram in accordance with one embodiment of the present invention.
Figure 4A:
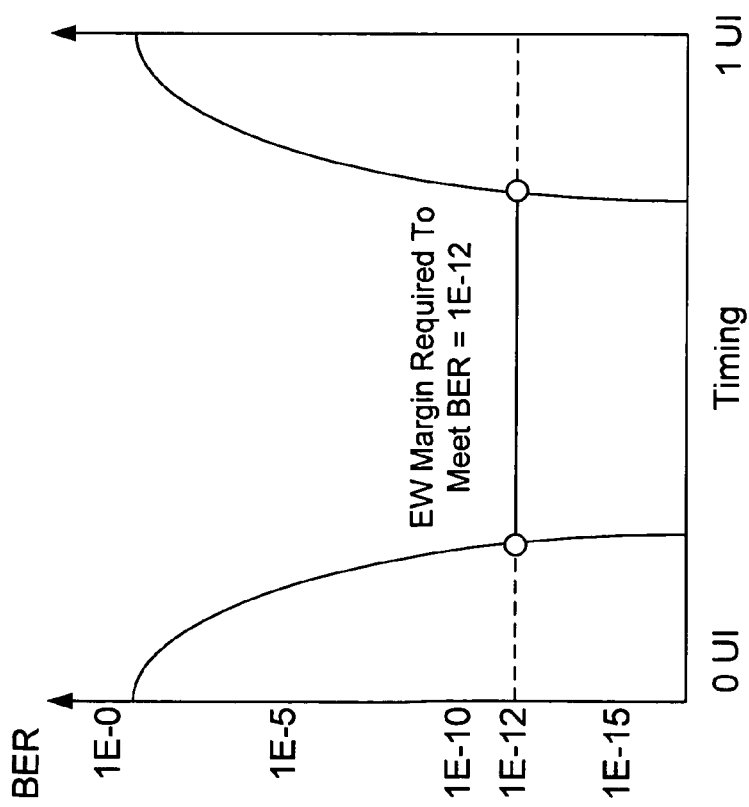
Figure 4C:
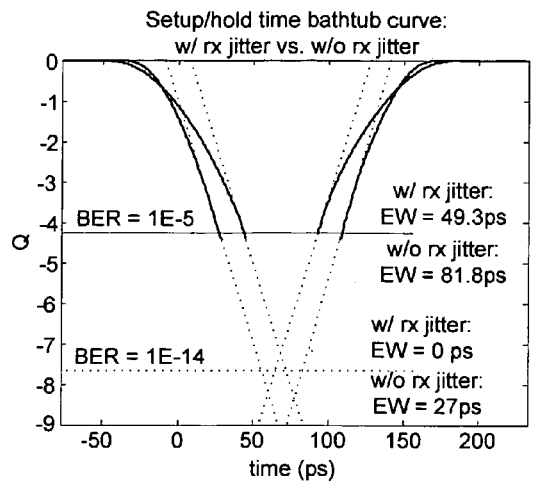
FIGS. 4C-4F show examples of the results of combined clock and data paths undergoing a BER simulation along a PTP interconnect using an embodiment of the present invention.
Figure 4D:
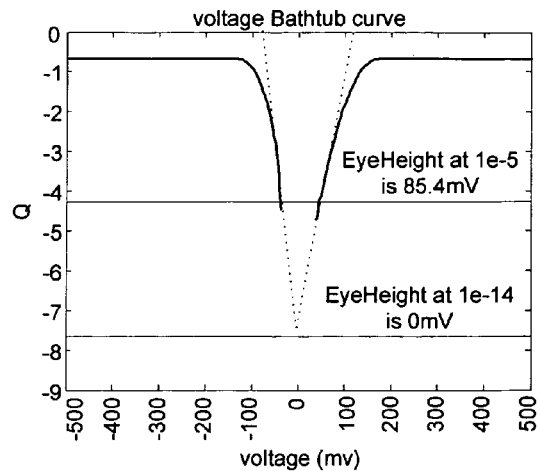
Figure 4E:
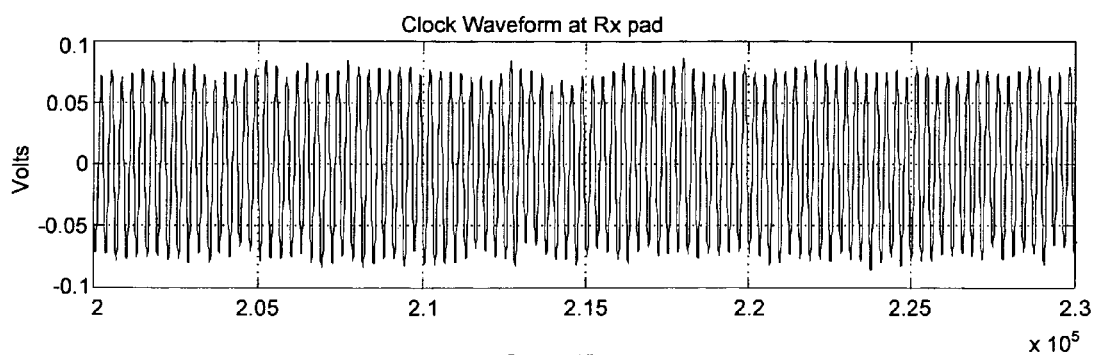
Figure 4F:
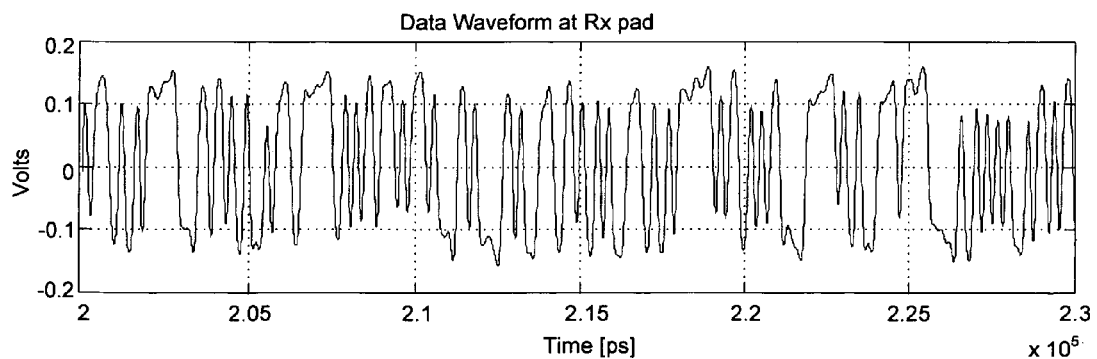

Referring now to FIGS. 4A and 4B, shown are an example of the timing bathtub curve and its relation to an eye diagram, FIGS. 4A and 4B, respectively. The bathtub curve of FIG. 4A has two branches that are associated with the cumulative probability distribution of the jitter in the eye diagram of FIG. 4B. The distance between the two branches at a given BER level gives the performance margin required to meet the BER requirement. FIGS. 4C-4F show examples of the results of combined clock and data paths undergoing a BER simulation along a PTP interconnect using an embodiment of the present invention. In one embodiment, the number of the simulated bits is one million and simulation time is approximately 5 minutes. The interpolation and superposition based-algorithm of embodiments of the present invention enables a fast time-domain analysis. Typically, a simulation with a bit sequence of 1 million bits long takes only 3 to 4 minutes, which significantly reduces the simulation time and improves work efficiency. As shown in FIGS. 4C and 4D various curves for setup/hold time (with received jitter versus without received jitter) and voltage may be realized. FIGS. 4E and 4F show snapshots of clock and data waveforms at the receiver using an embodiment of the present invention.

Embodiments can co-simulate the clock and data paths for busses with a forwarded-clock architecture, in contrast to existing BER tools. Furthermore, embodiments eliminate the round-off error in jitter injection, and is very flexible with coding schemes. These features and capacity improve the simulation accuracy, and consequently increase the confidence on platform designs.

Figure 5:
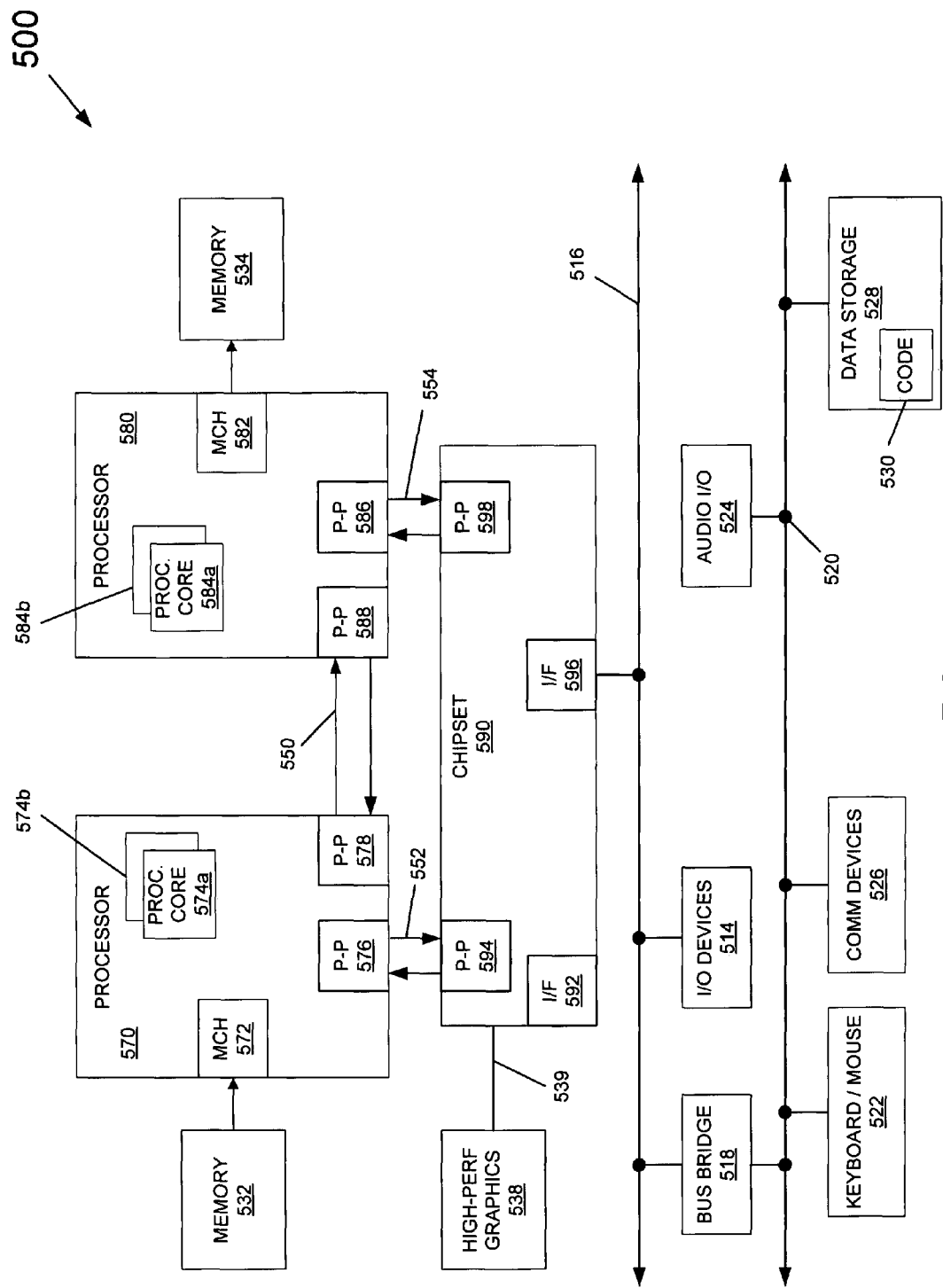
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b).

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note various interconnects of system 500 can have their BER analyzed using an embodiment of the present invention, which may be implemented in code 530, for example.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a jitter profile of a channel coupled between a transmitter and a receiver, a step response of the channel, a bit pattern to be transmitted along the channel, and an equalization setting for the transmitter;
   transmitting the bit pattern along the channel from the transmitter to the receiver with the jitter profile and the step response;
   receiving the bit pattern at the receiver and converting the bit pattern to a data stream by interpolating the step response according to a jitter of a current bit to obtain a jittery step response, and superposing the jittery step response onto the data stream;
   calculating the jitter at each transition bit of the bit pattern by determining a time difference between an actual crossing point and an ideal crossing point, and incrementing a jitter distribution function with the jitter; and
   generating a timing curve for the channel using the jitter distribution function.

2. The method of claim 1, further comprising co-simulating a clock path and a data path for a forwarded clock channel.

3. The method of claim 1, further comprising performing the interpolation and superposition without a direct convolution.

4. The method of claim 1, further comprising dynamically reusing a memory array allocated to the data stream.

5. The method of claim 4, further comprising dynamically reusing the memory array by recycling the memory array and moving a tail portion of the memory array after a predetermined bit location to a head of the memory array.

6. The method of claim 5, wherein generating the timing curve comprises generating a bathtub curve.

7. The method of claim 6, further comprising performing a dual-dirac extrapolation to generate the bathtub curve.

8. An article comprising a non-transitory machine-accessible medium including instructions that when executed cause a system to:
   receive a jitter profile of a channel coupled between a transmitter and a receiver, a step response of the channel, a bit pattern to be transmitted along the channel, and an equalization setting for the transmitter;
   transmit the bit pattern along the channel from the transmitter to the receiver with the jitter profile and the step response;
   receive the bit pattern at the receiver and convert the bit pattern to a data stream by interpolation of the step response according to a jitter of a current bit to obtain a jittery step response, and superposition of the jittery step response onto the data stream;
   calculate the jitter at each transition bit of the bit pattern by determination of a time difference between an actual crossing point and an ideal crossing point, and incrementation of a jitter distribution function with the jitter; and
   generate a timing curve for the channel using the jitter distribution function.

9. The article of claim 8, wherein the instructions enable the system to co-simulate a clock path and a data path for a forwarded clock channel.

10. The article of claim 8, wherein the instructions enable the system to perform the interpolation and superposition without a direct convolution.

11. The article of claim 8, wherein the instructions enable the system to dynamically reuse a memory array allocated to the data stream.

12. The article of claim 11, wherein the instructions enable the system to dynamically reuse the memory array by recycling the memory array and moving a tail portion of the memory array after a predetermined bit location to a head of the memory array.

13. The article of claim 12, wherein the instructions enable the system to generate a bathtub curve.

14. The article of claim 13, wherein the instructions enable the system to perform a dual-dirac extrapolation to generate the bathtub curve.

15. A system comprising:
   a first processor;
   a second processor coupled to the first processor by a first interconnect;
   a first memory coupled to the first processor by a first memory interconnect;
   a second memory coupled to the second processor by a second memory interconnect; and
   a storage device to store information, wherein the storage device is to store a first code portion to analyze the first interconnect, including to receive a jitter profile of the first interconnect, a step response of the first interconnect, a bit pattern to be transmitted along the first interconnect, and an equalization setting for the first interconnect, transmit the bit pattern along the first interconnect from the first processor to the second processor with the jitter profile and the step response, receive the bit pattern at the second processor and convert the bit pattern to a data stream by interpolation of the step response according to a jitter of a current bit to obtain a jittery step response, and superposition of the jittery step response onto the data stream, calculate the jitter at each transition bit of the bit pattern by determination of a time difference between an actual crossing point and an ideal crossing point, and incrementation of a jitter distribution function with the jitter, and generate a timing curve for the first interconnect using the jitter distribution function.

16. The system of claim 15, wherein the first code portion is to enable the system to perform the interpolation and superposition without a direct convolution.

17. The system of claim 15, wherein the first code portion is to enable the system to dynamically reuse a memory array allocated to the data stream.

18. The system of claim 17, wherein the first code portion is to enable the system to dynamically reuse the memory array by recycling the memory array and moving a tail portion of the memory array after a predetermined bit location to a head of the memory array.

* * * * *